US010036829B2

(12) United States Patent
Ghayour et al.

(10) Patent No.: US 10,036,829 B2
(45) Date of Patent: Jul. 31, 2018

(54) FAULT REMOVAL IN GEOLOGICAL MODELS

(71) Applicants: Kaveh Ghayour, Houston, TX (US); Linfeng Bi, Houston, TX (US); Xiaohui Wu, Sugar Land, TX (US)

(72) Inventors: Kaveh Ghayour, Houston, TX (US); Linfeng Bi, Houston, TX (US); Xiaohui Wu, Sugar Land, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 545 days.

(21) Appl. No.: 14/423,659

(22) PCT Filed: Aug. 23, 2013

(86) PCT No.: PCT/US2013/056437
§ 371 (c)(1),
(2) Date: Feb. 24, 2015

(87) PCT Pub. No.: WO2014/051903
PCT Pub. Date: Apr. 3, 2014

(65) Prior Publication Data
US 2015/0293260 A1 Oct. 15, 2015

Related U.S. Application Data

(60) Provisional application No. 61/707,686, filed on Sep. 28, 2012.

(51) Int. Cl.
*G01V 99/00* (2009.01)
*G06F 17/10* (2006.01)
*G01V 1/28* (2006.01)

(52) U.S. Cl.
CPC ............ *G01V 99/005* (2013.01); *G01V 1/282* (2013.01); *G06F 17/10* (2013.01); *G01V 2210/66* (2013.01)

(58) Field of Classification Search
CPC .. G01V 99/005; G01V 1/282; G01V 2210/66; G06F 17/10
See application file for complete search history.

(56) References Cited

U.S. PATENT DOCUMENTS 5,537,320 A 7/1996 Simpson et al.
5,671,136 A 9/1997 Willhoit, Jr.
(Continued)

FOREIGN PATENT DOCUMENTS

WO 1999/028767 6/1999
WO 2007/022289 2/2007
(Continued)

OTHER PUBLICATIONS

Sylvain Bandel et. al., Automatic Building of Structured Geological Models, ACM Symposium on Solid Modeling and Applications (2004), 1-11. (Year: 2004).*
(Continued)

*Primary Examiner* — Omar F Fernandez Rivas
*Assistant Examiner* — Justin C Mikowski
(74) *Attorney, Agent, or Firm* — ExxonMobil Upstream Research Company—Law Department

(57) ABSTRACT

Method for transforming a discontinuous, faulted subsurface reservoir into a continuous, fault-free space where a complete geological model based on selected geological concepts can be built and updated efficiently. Faults are removed in reverse chronological order (62) to generate a pseudo-physical continuous layered model, which is populated with information according to the selected geological concept (68). The fault removal is posed as an optimal control problem where unknown rigid body transformations and relative displacements on fault surfaces are found such that deformation of the bounding horizons and within the volume near the fault surface are minimized (63). A boundary-
(Continued)

element-method discretization in an infinite domain is used, with boundary data imposed only on fault surfaces. The data populated model may then be mapped back to the original faulted domain such that a one-to-one mapping between continuous and faulted spaces may be found to a desired tolerance (72).

13 Claims, 4 Drawing Sheets

(56) References Cited

U.S. PATENT DOCUMENTS

| | | |
|---|---|---|
| 5,706,194 A | 1/1998 | Neff et al. |
| 5,710,726 A | 1/1998 | Rowney et al. |
| 5,747,673 A | 5/1998 | Ungerer et al. |
| 5,838,634 A | 11/1998 | Jones et al. |
| 5,844,799 A | 12/1998 | Joseph et al. |
| 5,953,680 A | 9/1999 | Divies et al. |
| 5,992,519 A | 11/1999 | Ramakrishnan et al. |
| 6,018,498 A | 1/2000 | Neff et al. |
| 6,052,529 A | 4/2000 | Watts, III |
| 6,106,561 A | 8/2000 | Farmer |
| 6,128,577 A | 10/2000 | Assa et al. |
| 6,128,579 A | 10/2000 | McCormack et al. |
| 6,138,076 A | 10/2000 | Graf et al. |
| 6,230,101 B1 | 5/2001 | Wallis |
| 6,370,491 B1 | 4/2002 | Malthe-Sorenssen et al. |
| 6,374,185 B1 | 4/2002 | Taner et al. |
| 6,480,790 B1 | 11/2002 | Calvert et al. |
| 6,549,854 B1 | 4/2003 | Malinverno et al. |
| 6,597,995 B1 | 7/2003 | Cornu et al. |
| 6,662,146 B1 | 12/2003 | Watts |
| 6,664,961 B2 | 12/2003 | Ray et al. |
| 6,823,296 B2 | 11/2004 | Rey-Fabret et al. |
| 6,823,297 B2 | 11/2004 | Jenny et al. |
| 6,826,483 B1 | 11/2004 | Anderson et al. |
| 6,826,520 B1 | 11/2004 | Khan et al. |
| 6,826,521 B1 | 11/2004 | Hess et al. |
| 6,839,632 B2 | 1/2005 | Grace |
| 6,901,391 B2 | 5/2005 | Storm, Jr. et al. |
| 6,940,507 B2 | 9/2005 | Repin et al. |
| 6,980,940 B1 | 12/2005 | Gurpinar et al. |
| 6,987,878 B2 | 1/2006 | Lees et al. |
| 7,031,891 B2 | 4/2006 | Malthe-Sorenssen et al. |
| 7,043,367 B2 | 5/2006 | Granjeon |
| 7,043,410 B2 | 5/2006 | Malthe-Sorenssen et al. |
| 7,069,149 B2 | 6/2006 | Goff et al. |
| 7,089,166 B2 | 8/2006 | Malthe-Sorenssen et al. |
| 7,096,122 B2 | 8/2006 | Han |
| 7,096,172 B2 | 8/2006 | Colvin et al. |
| 7,177,787 B2 | 2/2007 | Rey-Fabret et al. |
| 7,191,071 B2 | 3/2007 | Kfoury et al. |
| 7,254,091 B1 | 8/2007 | Gunning et al. |
| 7,277,796 B2 | 10/2007 | Kuchuk et al. |
| 7,280,952 B2 | 10/2007 | Butler et al. |
| 7,286,972 B2 | 10/2007 | Maker |
| 7,363,163 B2 | 4/2008 | Valec-Dupin et al. |
| 7,369,980 B2 | 5/2008 | Deffenbaugh et al. |
| 7,376,539 B2 | 5/2008 | Lecomte |
| 7,379,853 B2 | 5/2008 | Middya |
| 7,379,854 B2 | 5/2008 | Calvert et al. |
| 7,406,878 B2 | 8/2008 | Rieder et al. |
| 7,412,363 B2 | 8/2008 | Callegari |
| 7,415,401 B2 | 8/2008 | Calvert et al. |
| 7,424,415 B2 | 9/2008 | Vassilev |
| 7,433,786 B2 | 10/2008 | Adams |
| 7,451,066 B2 | 11/2008 | Edwards et al. |
| 7,467,044 B2 | 12/2008 | Tran et al. |
| 7,478,024 B2 | 1/2009 | Gurpinar et al. |
| 7,480,205 B2 | 1/2009 | Wei |
| 7,486,589 B2 | 2/2009 | Lee et al. |
| 7,516,056 B2 | 4/2009 | Wallis et al. |
| 7,523,024 B2 | 4/2009 | Endres et al. |
| 7,526,418 B2 | 4/2009 | Pita et al. |
| 7,539,625 B2 | 5/2009 | Klumpen et al. |
| 7,542,037 B2 | 6/2009 | Fremming |
| 7,546,229 B2 | 6/2009 | Jenny et al. |
| 7,548,840 B2 | 6/2009 | Saaf |
| 7,577,527 B2 | 8/2009 | Velasquez |
| 7,584,081 B2 | 9/2009 | Wen et al. |
| 7,596,056 B2 | 9/2009 | Keskes et al. |
| 7,596,480 B2 | 9/2009 | Fung et al. |
| 7,596,481 B2 | 9/2009 | Zamora et al. |
| 7,603,265 B2 | 10/2009 | Mainguy et al. |
| 7,606,691 B2 | 10/2009 | Calvert et al. |
| 7,617,082 B2 | 11/2009 | Childs et al. |
| 7,620,800 B2 | 11/2009 | Huppenthal et al. |
| 7,640,149 B2 | 12/2009 | Rowan et al. |
| 7,657,494 B2 | 2/2010 | Wilkinson et al. |
| 7,672,825 B2 | 3/2010 | Brouwer et al. |
| 7,684,929 B2 | 3/2010 | Prange et al. |
| 7,706,981 B2 | 4/2010 | Wilkinson et al. |
| 7,711,532 B2 | 5/2010 | Dulac et al. |
| 7,716,029 B2 | 5/2010 | Couet et al. |
| 7,771,532 B2 | 5/2010 | Dulac et al. |
| 7,739,089 B2 | 6/2010 | Gurpinar et al. |
| 7,752,023 B2 | 7/2010 | Middya |
| 7,756,694 B2 | 7/2010 | Graf et al. |
| 7,783,462 B2 | 8/2010 | Landis, Jr. et al. |
| 7,796,469 B2 | 9/2010 | Keskes et al. |
| 7,809,537 B2 | 10/2010 | Hemanthkumar et al. |
| 7,809,538 B2 | 10/2010 | Thomas |
| 7,822,554 B2 | 10/2010 | Zuo et al. |
| 7,844,430 B2 | 11/2010 | Landis, Jr. et al. |
| 7,860,654 B2 | 12/2010 | Stone |
| 7,869,954 B2 | 1/2011 | Den Boer et al. |
| 7,877,246 B2 | 1/2011 | Moncorge et al. |
| 7,878,268 B2 | 2/2011 | Chapman et al. |
| 7,920,970 B2 | 4/2011 | Zuo et al. |
| 7,925,481 B2 | 4/2011 | Van Wagoner et al. |
| 7,932,904 B2 | 4/2011 | Branets et al. |
| 7,933,750 B2 | 4/2011 | Morton et al. |
| 7,953,585 B2 | 5/2011 | Gurpinar et al. |
| 7,970,593 B2 | 6/2011 | Roggero et al. |
| 7,986,319 B2 | 7/2011 | Dommisse |
| 7,991,660 B2 | 8/2011 | Callegari |
| 7,996,154 B2 | 8/2011 | Zuo et al. |
| 8,005,658 B2 | 8/2011 | Tilke et al. |
| 8,050,892 B2 | 11/2011 | Hartman |
| 8,078,437 B2 | 12/2011 | Wu et al. |
| 8,095,345 B2 | 1/2012 | Hoversten |
| 8,095,349 B2 | 1/2012 | Kelkar et al. |
| 8,117,019 B2 | 2/2012 | Sun et al. |
| 8,145,464 B2 | 3/2012 | Arengaard et al. |
| 8,190,405 B2 | 5/2012 | Appleyard |
| 8,204,726 B2 | 6/2012 | Lee et al. |
| 8,204,727 B2 | 6/2012 | Dean et al. |
| 8,209,202 B2 | 6/2012 | Narayanan et al. |
| 8,212,814 B2 | 7/2012 | Branets et al. |
| 8,234,073 B2 | 7/2012 | Pyrcz et al. |
| 8,249,842 B2 | 8/2012 | Ghorayeb et al. |
| 8,255,195 B2 | 8/2012 | Yogeswaren |
| 8,271,248 B2 | 9/2012 | Pomerantz et al. |
| 8,275,589 B2 | 9/2012 | Montaron et al. |
| 8,275,593 B2 | 9/2012 | Zhao |
| 8,280,635 B2 | 10/2012 | Ella et al. |
| 8,280,709 B2 | 10/2012 | Koutsabeloulis et al. |
| 8,285,532 B2 | 10/2012 | Zangl et al. |
| 8,301,426 B2 | 10/2012 | Abasov et al. |
| 8,301,429 B2 | 10/2012 | Hajibeygi et al. |
| 8,315,845 B2 | 11/2012 | Lepage |
| 8,335,677 B2 | 12/2012 | Yeten et al. |
| 8,339,395 B2 | 12/2012 | Williams et al. |
| 8,350,851 B2 | 1/2013 | Flew et al. |
| 8,355,898 B2 | 1/2013 | Pyrcz et al. |
| 8,359,184 B2 | 1/2013 | Massonnat |
| 8,359,185 B2 | 1/2013 | Pita et al. |
| 8,374,836 B2 | 2/2013 | Yogeswaren |
| 8,374,974 B2 | 2/2013 | Chen et al. |
| 8,386,227 B2 | 2/2013 | Fung et al. |
| 8,401,832 B2 | 3/2013 | Ghorayeb et al. |
| 8,412,501 B2 | 4/2013 | Oury et al. |
| 8,412,502 B2 | 4/2013 | Moncorge et al. |

(56) References Cited

U.S. PATENT DOCUMENTS

| | | |
|---|---|---|
| 8,423,338 B2 | 4/2013 | Ding et al. |
| 8,428,919 B2 | 4/2013 | Parashkevov |
| 8,429,671 B2 | 4/2013 | Wood et al. |
| 8,433,551 B2 | 4/2013 | Fung et al. |
| 8,437,999 B2 | 5/2013 | Pita et al. |
| 8,447,522 B2 | 5/2013 | Brooks |
| 8,447,525 B2 | 5/2013 | Pepper |
| 8,452,580 B2 | 5/2013 | Strebelle |
| 8,457,940 B2 | 6/2013 | Xi et al. |
| 8,463,586 B2 | 6/2013 | Mezghani et al. |
| 8,484,004 B2 | 7/2013 | Schottle et al. |
| 8,489,375 B2 | 7/2013 | Omeragic et al. |
| 8,494,828 B2 | 7/2013 | Wu et al. |
| 8,498,852 B2 | 7/2013 | Xu et al. |
| 8,510,242 B2 | 8/2013 | Al-Fattah |
| 8,515,678 B2 | 8/2013 | Pepper et al. |
| 8,515,720 B2 | 8/2013 | Koutsabeloulis et al. |
| 8,515,721 B2 | 8/2013 | Morton et al. |
| 8,521,496 B2 | 8/2013 | Schottle et al. |
| 8,504,341 B2 | 9/2013 | Cullick et al. |
| 8,532,967 B2 | 9/2013 | Torrens et al. |
| 8,532,969 B2 | 9/2013 | Li et al. |
| 8,543,364 B2 | 9/2013 | Liu et al. |
| 8,577,660 B2 | 11/2013 | Wendt et al. |
| 8,583,411 B2 | 11/2013 | Fung |
| 8,589,135 B2 | 11/2013 | Middya et al. |
| 8,594,986 B2 | 11/2013 | Lunati |
| 8,599,643 B2 | 12/2013 | Pepper et al. |
| 8,606,524 B2 | 12/2013 | Soliman et al. |
| 8,606,555 B2 | 12/2013 | Pyrcz et al. |
| 8,612,194 B2 | 12/2013 | Horne et al. |
| 8,612,195 B2 | 12/2013 | Sun et al. |
| 8,630,831 B2 | 1/2014 | Bratvedt et al. |
| 8,635,026 B2 | 1/2014 | Ameen |
| 8,639,444 B2 | 1/2014 | Pepper et al. |
| 8,655,632 B2 | 2/2014 | Moguchaya |
| 8,674,984 B2 | 3/2014 | Ran et al. |
| 8,676,557 B2 | 3/2014 | Ding et al. |
| 8,686,996 B2 | 4/2014 | Cheung et al. |
| 8,688,424 B2 | 4/2014 | Bourbiaux et al. |
| 8,694,261 B1 | 4/2014 | Robinson |
| 8,700,549 B2 | 4/2014 | Hossain et al. |
| 8,712,746 B2 | 4/2014 | Tillier et al. |
| 8,712,747 B2 | 4/2014 | Cullick et al. |
| 8,718,958 B2 | 5/2014 | Breton et al. |
| 8,718,993 B2 | 5/2014 | Klie |
| 8,731,887 B2 | 5/2014 | Hilliard et al. |
| 8,731,891 B2 | 5/2014 | Sung et al. |
| 8,738,294 B2 | 5/2014 | Ameen |
| 8,762,442 B2 | 6/2014 | Jeong et al. |
| 8,775,141 B2 | 7/2014 | Raphael |
| 8,775,142 B2 | 7/2014 | Liu et al. |
| 8,775,144 B2 | 7/2014 | Han et al. |
| 8,776,895 B2 | 7/2014 | Lie et al. |
| 8,780,671 B2 | 7/2014 | Sayers |
| 8,793,111 B2 | 7/2014 | Tilke et al. |
| 8,797,319 B2 | 8/2014 | Lin |
| 8,798,974 B1 | 8/2014 | Nunns |
| 8,798,977 B2 | 8/2014 | Hajibeygi et al. |
| 8,803,878 B2 | 8/2014 | Andersen et al. |
| 8,805,660 B2 | 8/2014 | Güyagüler et al. |
| 8,812,334 B2 | 8/2014 | Givens et al. |
| 8,818,778 B2 | 8/2014 | Salazar-Tio et al. |
| 8,818,780 B2 | 8/2014 | Calvert et al. |
| 8,825,461 B2 | 9/2014 | Sun et al. |
| 8,843,353 B2 | 9/2014 | Posamentier et al. |
| 8,855,986 B2 | 10/2014 | Castellini et al. |
| 8,855,987 B2 | 10/2014 | Imhof et al. |
| 8,862,450 B2 | 10/2014 | Derfoul et al. |
| 8,874,804 B2 | 10/2014 | AlShaikh et al. |
| 8,892,412 B2 | 11/2014 | Ghayour et al. |
| 8,898,017 B2 | 11/2014 | Kragas et al. |
| 8,903,694 B2 | 12/2014 | Wallis et al. |
| 8,922,558 B2 | 12/2014 | Page et al. |
| 8,935,141 B2 | 1/2015 | Ran et al. |
| 9,058,445 B2 | 6/2015 | Usadi et al. |
| 9,187,984 B2 | 11/2015 | Usadi et al. |
| 9,372,943 B2 | 6/2016 | Li et al. |
| 2002/0049575 A1 | 4/2002 | Jalali et al. |
| 2005/0171700 A1 | 8/2005 | Dean |
| 2006/0122780 A1 | 6/2006 | Cohen et al. |
| 2006/0269139 A1 | 11/2006 | Keskes et al. |
| 2007/0016389 A1 | 1/2007 | Ozgen |
| 2007/0277115 A1 | 11/2007 | Glinsky et al. |
| 2007/0279429 A1 | 12/2007 | Ganzer et al. |
| 2008/0126168 A1 | 5/2008 | Carney et al. |
| 2008/0133550 A1 | 6/2008 | Orangi et al. |
| 2008/0144903 A1 | 6/2008 | Wang et al. |
| 2008/0234988 A1 | 9/2008 | Chen et al. |
| 2008/0306803 A1 | 12/2008 | Vaal et al. |
| 2009/0071239 A1 | 3/2009 | Rojas et al. |
| 2009/0122061 A1 | 5/2009 | Hammon, III |
| 2009/0248373 A1 | 10/2009 | Druskin et al. |
| 2010/0132450 A1 | 6/2010 | Pomerantz et al. |
| 2010/0138196 A1 | 6/2010 | Hui et al. |
| 2010/0161300 A1 | 6/2010 | Yeten et al. |
| 2010/0179797 A1 | 7/2010 | Cullick et al. |
| 2010/0185428 A1 | 7/2010 | Vink |
| 2010/0191516 A1 | 7/2010 | Benish et al. |
| 2010/0312535 A1 | 12/2010 | Chen et al. |
| 2010/0324873 A1 | 12/2010 | Cameron |
| 2011/0004447 A1 | 1/2011 | Hurley et al. |
| 2011/0015910 A1 | 1/2011 | Ran et al. |
| 2011/0054869 A1 | 3/2011 | Li et al. |
| 2011/0115787 A1 | 5/2011 | Kadlec |
| 2011/0161133 A1 | 6/2011 | Staveley et al. |
| 2011/0310101 A1 | 12/2011 | Prange et al. |
| 2012/0059640 A1 | 3/2012 | Roy et al. |
| 2012/0065951 A1 | 3/2012 | Roy et al. |
| 2012/0143577 A1 | 6/2012 | Szyndel et al. |
| 2012/0158389 A1 | 6/2012 | Wu et al. |
| 2012/0159124 A1 | 6/2012 | Hu et al. |
| 2012/0215512 A1 | 8/2012 | Sarma |
| 2012/0215513 A1 | 8/2012 | Branets et al. |
| 2012/0232589 A1 | 9/2012 | Pomerantz et al. |
| 2012/0232799 A1 | 9/2012 | Zuo et al. |
| 2012/0232859 A1 | 9/2012 | Pomerantz et al. |
| 2012/0232861 A1 | 9/2012 | Lu et al. |
| 2012/0232865 A1 | 9/2012 | Maucec et al. |
| 2012/0265512 A1 | 10/2012 | Hu et al. |
| 2012/0271609 A1 | 10/2012 | Laake et al. |
| 2012/0296617 A1 | 11/2012 | Zuo et al. |
| 2013/0030782 A1 | 1/2013 | Yogeswaren |
| 2013/0035913 A1 | 2/2013 | Mishev et al. |
| 2013/0041633 A1 | 2/2013 | Hoteit |
| 2013/0046524 A1 | 2/2013 | Gathogo et al. |
| 2013/0073268 A1 | 3/2013 | Abacioglu et al. |
| 2013/0080128 A1 | 3/2013 | Yang et al. |
| 2013/0085730 A1 | 4/2013 | Shaw et al. |
| 2013/0090907 A1 | 4/2013 | Maliassov |
| 2013/0096890 A1 | 4/2013 | Vanderheyden et al. |
| 2013/0096898 A1 | 4/2013 | Usadi et al. |
| 2013/0096899 A1 | 4/2013 | Usadi et al. |
| 2013/0096900 A1 | 4/2013 | Usadi et al. |
| 2013/0110484 A1 | 5/2013 | Hu et al. |
| 2013/0112406 A1 | 5/2013 | Zuo et al. |
| 2013/0116993 A1 | 5/2013 | Maliassov |
| 2013/0118736 A1 | 5/2013 | Usadi et al. |
| 2013/0124097 A1 | 5/2013 | Thorne |
| 2013/0124161 A1 | 5/2013 | Poudret et al. |
| 2013/0124173 A1 | 5/2013 | Lu et al. |
| 2013/0138412 A1 | 5/2013 | Shi et al. |
| 2013/0151159 A1 | 6/2013 | Pomerantz et al. |
| 2013/0166264 A1 | 6/2013 | Usadi et al. |
| 2013/0179080 A1 | 7/2013 | Skalinski et al. |
| 2013/0185033 A1 | 7/2013 | Tompkins et al. |
| 2013/0204922 A1 | 8/2013 | El-Bakry et al. |
| 2013/0231907 A1 | 9/2013 | Yang et al. |
| 2013/0231910 A1 | 9/2013 | Kumar et al. |
| 2013/0245949 A1 | 9/2013 | Abitrabi et al. |
| 2013/0246031 A1 | 9/2013 | Wu et al. |
| 2013/0289961 A1 | 10/2013 | Ray et al. |
| 2013/0289962 A1 | 10/2013 | Wendt et al. |
| 2013/0304679 A1 | 11/2013 | Fleming et al. |

(56) References Cited

U.S. PATENT DOCUMENTS

| | | |
|---|---|---|
| 2013/0311151 A1 | 11/2013 | Plessix |
| 2013/0312481 A1 | 11/2013 | Pelletier et al. |
| 2013/0332125 A1 | 12/2013 | Suter et al. |
| 2013/0338985 A1 | 12/2013 | Garcia et al. |
| 2014/0012557 A1 | 1/2014 | Tarman et al. |
| 2014/0166280 A1 | 6/2014 | Stone et al. |
| 2014/0201450 A1 | 7/2014 | Haugen |
| 2014/0214388 A1 | 7/2014 | Gorell |
| 2014/0222342 A1 | 8/2014 | Robinson |
| 2014/0236558 A1 | 8/2014 | Maliassov |
| 2014/0330547 A1 | 11/2014 | Calvert et al. |
| 2015/0134314 A1 | 5/2015 | Lu et al. |
| 2015/0136962 A1 | 5/2015 | Pomerantz et al. |
| 2015/0293260 A1 | 10/2015 | Ghayour et al. |
| 2016/0035130 A1 | 2/2016 | Branets et al. |
| 2016/0041279 A1 | 2/2016 | Casey |
| 2016/0124113 A1 | 2/2016 | Bi et al. |
| 2016/0124117 A1 | 5/2016 | Huang et al. |
| 2016/0125555 A1 | 5/2016 | Branets et al. |

FOREIGN PATENT DOCUMENTS

| | | |
|---|---|---|
| WO | 2007/116008 | 10/2007 |
| WO | 2009/138290 | 11/2009 |
| WO | 2013/180709 | 12/2013 |
| WO | 2014/027196 | 2/2014 |

OTHER PUBLICATIONS

Hoffman, K.S., (1999), "Horizon Modeling Using a Three-Dimensional Fault Restoration Technique", SPE 56445, 8 pgs.

Hoffman, K.S., et al., (2000), "Reservoir Characterization Using Three-Dimensional Fault Restoration", SEG Expanded Abstracts, 4 pgs.

Hoffman, K.S., et al., (2001), "Improvements in 3-D Structural Modeling of Growth-Faulted Reservoirs", SEG Expanded Abstracts, vol. 20, 4 pgs.

Moyen, R., et al., (2004), "3D-Parameterization of the 3D Geological Space—The Geochron Model", The Geochron Model, 8 pgs.

U.S. Appl. No. 14/461,193, filed Aug. 15, 2014, Casey.

Aarnes, J. et al. (2004), "Toward reservoir simulation on geological grid models", $9^{th}$ European Conf. on the Mathematics of Oil Recovery, 8 pgs.

Ahmadizadeh, M., et al., (2007), "Combined Implicit or Explicit Integration Steps for Hybrid Simulation", Structural Engineering Research Frontiers, pp. 1-16.

Bortoli, L. J., et al., (1992), "Constraining Stochastic Images to Seismic Data", Geostatistics, Troia, Quantitative Geology and Geostatistics 1, pp. 325-338.

Byer, T.J., et al., (1998), "Preconditioned Newton Methods for Fully Coupled Reservoir and Surface Facility Models", SPE 49001, 1998 SPE Annual Tech. Conf., and Exh., pp. 181-188.

Candes, E. J., et al., (2004), "New Tight Frames of Curvelets and Optimal Representations of Objects with $C^2$ Singularities," Communications on Pure and Applied Mathematics 57, pp. 219-266.

Chen, Y. et al. (2003), "A coupled local-global upscaling approach for simulating flow in highly heterogeneous formations", Advances in Water Resources 26, pp. 1041-1060.

Connolly, P., (1999), "Elastic Impedance," The Leading Edge 18, pp. 438-452.

Crotti, M.A. (2003), "Upscaling of Relative Permeability Curves for Reservoir Simulation: An Extension to Areal Simulations Based on Realistic Average Water Saturations", SPE 81038, SPE Latin American and Caribbean Petroleum Engineering Conf., 6 pgs.

Donoho, D. L., Hou, X., (2002), "Beamlets and Multiscale Image Analysis," Multiscale and Multiresolution Methods, Lecture Notes in Computational Science and Engineering 20, pp. 149-196.

Durlofsky, L.J. (1991), "Numerical Calculation of Equivalent Grid Block Permeability Tensors for Heterogeneous Porous Media", Water Resources Research 27(5), pp. 699-708.

Farmer, C.L. (2002), "Upscaling: a review", Int'l. Journal for Numerical Methods in Fluids 40, pp. 63-78.

Gai, X., et al., (2005), "A Timestepping Scheme for Coupled Reservoir Flow and Geomechanics in Nonmatching Grids", SPE 97054, 2005 SPE Annual Tech. Conf and Exh., pp. 1-11.

Haas, A., et al., (1994), "Geostatistical Inversion—A Sequential Method of Stochastic Reservoir Modeling Constrained by Seismic Data," First Break 12, pp. 561-569 (1994).

Holden, L. et al. (1992), "A Tensor Estimator for the Homogenization of Absolute Permeability", Transport in Porous Media 8, pp. 37-46.

Isaaks, E. H., et al., (1989), "Applied Geostatistics", Oxford University Press, New York, pp. 40-65.

Journel, A., (1992), "Geostatistics: Roadblocks and Challenges," Geostatistics, Troia '92: Quanititative Geoglogy and Geostatistics 1, pp. 213-224.

Klie, H., et al., (2005), "Krylov-Secant Methods for Accelerating the Solution of Fully Implicit Formulations", SPE 92863, 2005 SPE Reservoir Simulation Symposium, 9 pgs.

Mallat, S., (1999), "A Wavelet Tour of Signal Processing", Academic Press, San Diego, pp. 80-91.

Lu, B., et al., (2007), "Iteratively Coupled Reservoir Simulation for Multiphase Flow", SPE 110114, 2007 SPE Annual Tech. Conf and Exh., pp. 1-9.

Mosqueda, G., et al., (2007), "Combined Implicit or Explicit Integration Steps for Hybrid Simulation", Earthquake Engng. & Struct. Dyn., vol. 36(15), pp. 2325-2343.

Strebelle, S., (2002), "Conditional simulations of complex geological structures using multiple-point statistics," Mathematical Geology 34(1), pp. 1-21.

Sweldens, W., (1998), "The Lifting Scheme: A Construction of Second Generation Wavelets," SIAM Journal on Mathematical Analysis 29, pp. 511-546.

Qi, D. et al. (2001), "An Improved Global Upscaling Approach for Reservoir Simulation", Petroleum Science and Technology 19(7 &8), pp. 779-795.

Verly, G., (1991), "Sequential Gaussian Simulation: A Monte Carlo Approach for Generating Models of Porosity and Permeability," Special Publication No. 3 of EAPG—Florence 1991 Conference, Ed.: Spencer, A.M, pp. 345-356.

Whitcombe, D. N., et al., (2002), "Extended elastic impedance for fluid and lithology prediction," Geophysics 67, pp. 63-67.

White, C.D. et al. (1987), "Computing Absolute Transmissibility in the Presence of Fine-Scale Heterogeneity", SPE 16011, $9^{th}$ SPE Symposium in Reservoir Simulation, pp. 209-220.

Wu, X.H. et al. (2007), "Reservoir Modeling with Global Scaleup", SPE 105237, $15^{th}$ SPE Middle East Oil & Gas Show & Conf., 13 pgs.

Yao, T., et al., (2004), "Spectral Component Geologic Modeling: A New Technology for Integrating Seismic Information at the Correct Scale," Geostatistics Banff, Quantitative Geology & Geostatistics 14, pp. 23-33.

Younis, R.M., et al., (2009), "Adaptively-Localized-Continuation-Newton: Reservoir Simulation Nonlinear Solvers That Converge All the Time", SPE 119147, 2009 SPE Reservoir Simulation Symposium, pp. 1-21.

Zhang T., et al., (2006), "Filter-based classification of training image patterns for spatial Simulation," Mathematical Geology 38, pp. 63-80.

Aarnes, J. (2004), "Multiscale simulation of flow in heterogeneous oil-reservoirs", SINTEF ICT, Dept. of Applied Mathematics, 2 pgs.

Haugen, K. B., et al., (2013), "Highly Optimized Phase Equilibrium Calculations", SPE 163583, pp. 1-9.

* cited by examiner

FAULT REMOVAL IN GEOLOGICAL MODELS

This application is the National Stage entry under 35 U.S.C. 371 of PCT Application No. PCT/US2013/056437, that published as International Publication No. 2014/051903 and was filed on 23 Aug. 2013, which claims the benefit of U.S. Provisional Application No. 61/707,686, filed on 28 Sep. 2012 entitled FAULT REMOVAL IN GEOLOGICAL MODELS, each of which is incorporated herein by reference, in its entirety, for all purposes.

TECHNOLOGICAL FIELD

This disclosure relates generally to the field of geophysical prospecting and, more particularly, to fault removal in geological models of subsurface hydrocarbon reservoirs. Specifically, this disclosure is about sequential removal of faults from geological models with minimal deformation in the fault vicinity, using a forward and inverse boundary element method augmented with rigid body transformations and optimization.

BACKGROUND

A technical problem addressed by the present technological advancement is transforming a discontinuous, i.e. faulted, subsurface reservoir into a continuous, fault-free space where a complete geological model based on the geological concepts of interest can be built and updated efficiently. However, it should be noted that the present technological advancement is not a technique for reverse engineering of faulting events, a process known as fault restoration in structural geology. However, the terms "fault removal" and "fault restoration" are sometimes used interchangeably in the literature.

Faults break up depositional strata by cutting across and offsetting them. As such, the preserved geometry of a subsurface reservoir can be significantly different from its geometry at the time active sedimentation subsided. As geological concepts are often tied to distinct geological events and/or environments of deposition, it can be quite difficult and cumbersome to apply them to fragmented and offset regions. Moreover, incorporation of new data into such a geologic model, or changing the geological interpretation or structural framework, are not necessarily straightforward tasks and may require building the geological model from "scratch" in its entirety. Therefore, it is desirable to transform discontinuous faulted regions into continuous regions where geological concepts can be easily applied and modified. This is a main focus of the present technological advancement.

Fault removal has received some attention the in the last decade and at least two patents exist on this topic.

In U.S. Pat. No. 7,480,205, incorporated herein by reference in its entirety, the inventor addresses the problem of seismic fault restoration by devising a model based on elasticity theory and using finite element and boundary element numerical methods for validating the correlations of interpreted horizons. The method is claimed to be computationally fast enough to allow interactive fault reversal and permit experimentation with various unfaulting scenarios so that a geologically acceptable solution is achieved. This patent has the following short comings First, it fails to address the quality of the mapping between the two spaces. It is well known by someone skilled in the technical field that the distortion in the vicinity of faults for this class of problems can lead to significant distortion or overturning of internal surfaces and/or layering. Second, the described approach treats faults on a one-by-one basis, in no particular order, and is more suitable for validating the seismic interpretation while the present technological advancement deals with sequential fault removal in the reverse chronological order.

In U.S. Patent application publication 2011/0106507, incorporated herein by reference in its entirety, the authors use a similar solid material deformation model as in U.S. Pat. No. 7,480,205 and calculate fields of displacement to build a virtual deposition space matching the environment at the time of deposition.

SUMMARY

The present technological advancement applies to all geological concepts, such as geostatistical, object-based methods, and geologic templates based on a functional form representation. The latter was recently disclosed in the PCT Patent Application Publication WO 2012/07812, "Constructing Geologic Models from Geologic Concepts" by Wu et al., incorporated herein by reference in its entirety. The functional form representation captures the conceived geologic descriptions with implicit or explicit mathematical functions that include properties and geometry of elements that may affect the movement of fluids in the subsurface region. Removing faults from a faulted reservoir can be done in many ways, but the problem of removing faults in a geologically plausible manner is a challenging task. More specifically, preserving the surfaces that impact the subsurface fluid flow and ensuring that they are not distorted by the numerical artifacts of the fault removal process is a particularly advantageous aspect of the present technological advancement. Among the geological concepts mentioned above, the functional form representation of geologic templates disclosed in the aforementioned publication WO 2012/07812 is the only one that explicitly attempts to include sub seismic flow-impacting surfaces in the final geological model. Hence, functional form representation of geological concepts is very sensitive to the quality of the fault removal procedure and was an inspiration for the present technological advancement. Some examples of geological concepts of interest include, but are not limited to, significant surfaces affecting fluid flow, porosity, permeability and facies distributions. As some concepts may require a grid for their specification, the present technological advancement also addresses the transformation of the grid from the continuous region to the original faulted reservoir without incurring excessive nonphysical deformation in the fault's vicinity.

The present technological advancement facilitates the application of mathematically defined geological concepts to geological models with a faulted structural framework. As geological concepts are usually described with the aid of continuous functions, it is necessary to transform discontinuous faulted regions into continuous regions where geological concepts can be easily applied. Important surfaces or horizons, volumetric grid and property models are envisioned to be generated in the continuous region and mapped back into the faulted domain to constitute the final geological model. This process of fault removal and generation of continuous regions has received some attention in the last couple years and a few publications and patents exist on this topic. However, one aspect of the work that greatly affects the quality of the final geological model has apparently not received any attention. A crucial step in the fault removal process is the quality of the mapping from the continuous region back to the original faulted region. This mapping preferably is done in a manner such that the resulting surfaces, layering, or volumetric grid in the faulted domain do not exhibit excessive numerically-induced non-physical or non-geological deformation in the immediate vicinity of faults. The present technological advancement presents a method for fault removal with the above considerations playing an instrumental role in its formulation and implementation.

A method for fault removal of one or more faults in a subsurface geological model in order to populate the model with desired information, comprising:

(a) ordering the one or more faults in reverse chronological order, and selecting the first fault;

(b) removing the selected fault by iteratively solving, using a computer, an optimal control problem wherein Laplace's equation is solved for an optimal set of rigid body transformations and boundary displacement vectors on the fault's surface;

(c) repeating (b) as necessary to remove any remaining faults, one at a time, in reverse chronological order, resulting in a transformation of the geological model from faulted space to continuous space;

(d) populating said geological model with faults removed with selected grids or surfaces or physical property values;

(e) computing a mapping of the populated geological model back to the faulted space.

BRIEF DESCRIPTION OF THE DRAWINGS

The present technological advancement and its advantages will be better understood by referring to the following detailed description and the attached drawings in which.

Figure 1:
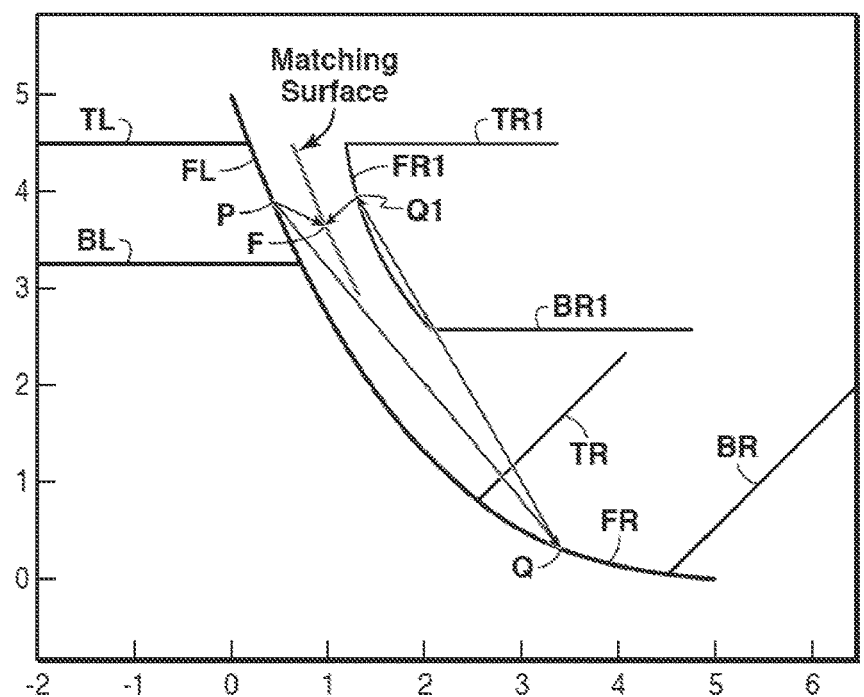
FIG. 1 is a general schematic diagram of faulting, showing how a subsurface layer can be interrupted by a fault causing the part of the layer on the other side of the fault to be translated, rotated, and deformed.

The present technological advancement will be described in connection with examples that are illustrative only, and are not to be construed as limiting the scope of the claims. On the contrary, the present technological advancement is intended to cover all alternatives, modifications and equivalents that may be included within the scope of the invention, as defined by the appended claims. It will be apparent to those trained in the technical field that all practical applications of the present inventive method are performed using a computer.

DETAILED DESCRIPTION

The following describes a method for removing faults from a geologic model and computing a pseudo-physical continuous layering by tracking faulting events in reverse chronological order. The main goal of this fault removal or unfaulting procedure is to find a transformation that allows the user to go back and forth between the faulted volume and the continuous fault-free volume. It may be helpful to describe the present technological advancement at least partly by comparing and contrasting it to known methods to solve the same technical problem, primarily the aforementioned publications US 2011/0106507 and U.S. Pat. No. 7,480,205.

Existing methods use a solid material deformation model such as elasticity theory or a variant augmented with plastic or viscoelastic behavior to compute the deformation field. This deformation field constitutes the transformation between faulted and unfaulted regions. The present technological advancement, however, uses a combination of rigid body transformation and a purely generic mathematical model, namely Laplace's equation, to bring the offset horizons together and create the continuous region. The rigid body transformation does most of the work by bringing the faulted horizons as close as possible without creating any nonphysical artifacts. The scalar field arising from the solution of the Laplace's equation with suitable boundary conditions is subsequently used to close the remaining gap and create the continuous horizons. The present technological advancement integrates rigid body transformations in the fault removal strategy to minimize distortion. The rigid body transformation is well known to geologists and persons in other scientific disciplines, although it does not appear to have been used before in the published literature either to bring faulted regions together or in a deformation model to remove the faults. In lay terms, a rigid body transformation means a rotation and/or translation of an object without any bending or twisting.

This disclosure poses the fault removal problem as an optimal control problem, i.e. a numerical inversion process of iterative optimization, a well-known procedure in other applications such as geophysical data inversion to infer a physical property model. As can be applied in the present technological advancement, the rigid body transformations and the boundary conditions on the fault surfaces are the unknown quantities in the inversion that are found in such a manner that the resulting deformation of the horizons in the fault vicinity is minimized. As rigid body transformations are linear functions of the Cartesian coordinates, they satisfy Laplace's equation identically and can be incorporated in the Laplace equation solution seamlessly. As such, only one optimal control problem needs to be solved to account for both the deformation field and the rigid body transformation.

The publications US 2011/0106507 and U.S. Pat. No. 7,480,205 make some a priori assumptions about the variation of throw and heave (components of relative movement on the fault surface) along the fault surface, e.g., linear variation between the top and bottom horizons, and find a solution for their deformation field without regard for the induced deformation in the immediate vicinity of faults. In the present technological advancement, the problem is under-determined by design to allow an infinite number of unfaulting scenarios. The solution of the optimal control problem chooses one or several scenarios that minimize some measure of the distortion incurred on the bounding horizons and internally in the volume between the bounding surfaces and near the fault surface. In clear contrast with existing techniques, this disclosure teaches a fault removal strategy where reduction or minimization of unphysical distortion in the fault vicinity is a main concern.

Laplace's equation is used in other technical fields, for example in electromagnetic problems. In the present technological advancement, Laplace's equation is used as a deformation model. Unlike current methods, the deformation equation, i.e., the Laplace equation, is solved with boundary conditions only on the fault surface with no conditions imposed on bounding horizons. By imposing no boundary conditions on bounding horizons and hence solving the problem in infinite space, the size of the problem is reduced considerably and the excessive deformation that can potentially occur close to the intersection of bounding horizons with the fault surface due to the mismatch between imposed boundary conditions on those surfaces is avoided all together.

Both of the aforementioned publications primarily discuss the transformation from the faulted volume to the continuous volume but the transformation in the opposite direction is ignored all together. In this disclosure, the inverse transformation from the continuous region back to the faulted domain is addressed by solving an inverse problem that finds the one-to-one mapping between the two spaces (continuous and faulted) to the desired accuracy. This may be achieved by computing the discrete sensitivities of the boundary element discretization of the deformation field with respect to the Cartesian coordinates of points in the faulted domain and using a gradient-based optimization method to iteratively find the one-to-one mapping between the volumes.

Figure 6:
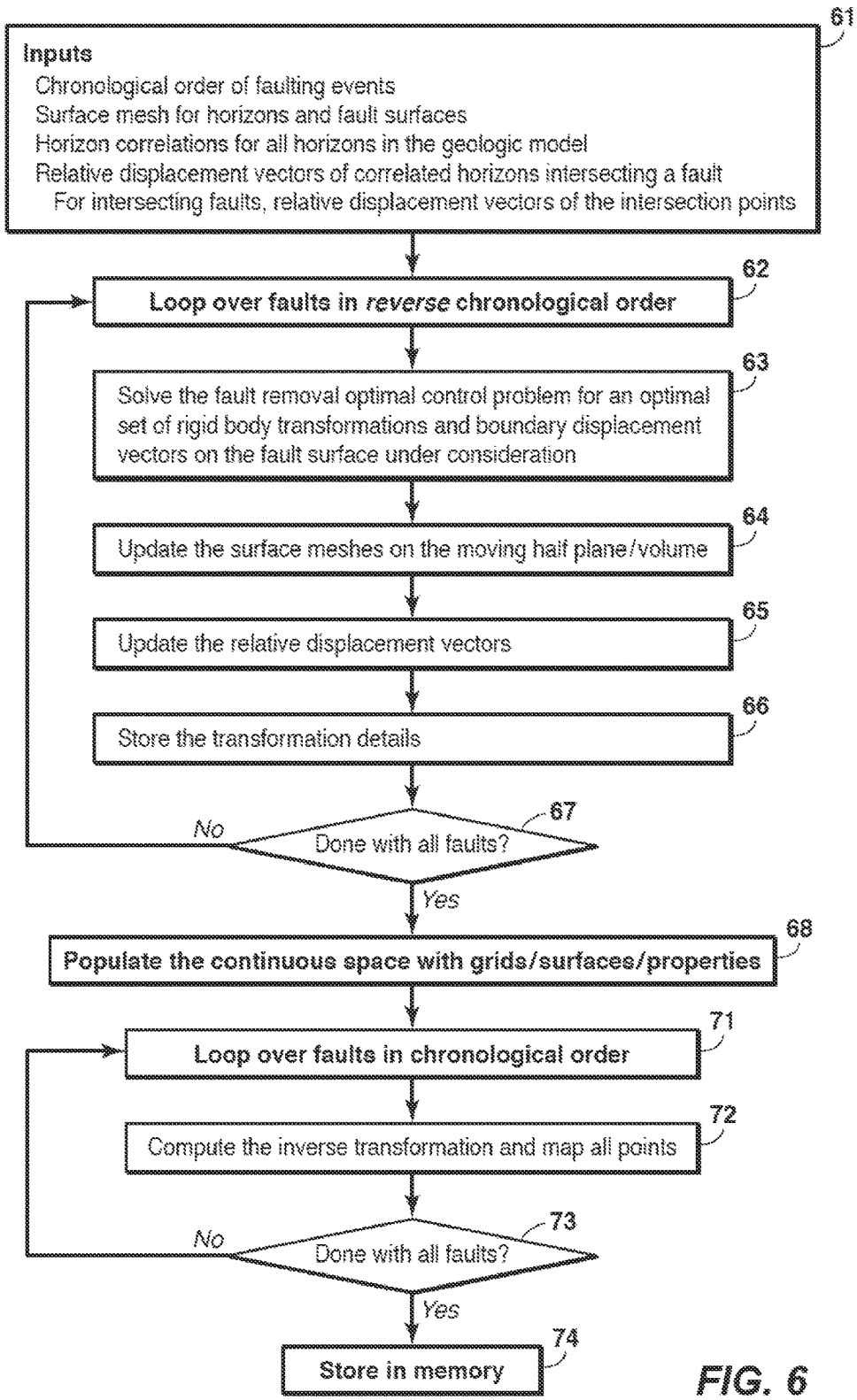
FIG. 6 is a flowchart showing basic steps in an exemplary method for fault removal.

FIG. 6 is a flow chart showing basic steps in an exemplary method of fault removal. The steps are not necessarily performed in the method recited and some steps may be omitted.

Input quantities 61 may include one or more of the following.
(1) A computer model of the subsurface geology showing location of one or more faults, and the chronological order of faulting events as interpreted by a structural geologist for the subsurface hydrocarbon reservoir of interest.
(2) This method does not require a volumetric grid for the reservoir and can utilize surface meshes for horizons and fault surfaces as input.
(3) Horizon correlations as interpreted by a structural geologist are used as input to guide the numerical fault removal methodology and restore the horizons to a pseudo pre-faulting continuous state.
(4) The horizon correlations from (3) are then preprocessed to obtain relative displacement vectors at the intersection of horizons with fault surfaces. The relative displacement on a fault surface may not be uniform and is known only at the intersection with the horizons but is unknown a priori elsewhere on the fault surface. This "under determinacy" of the relative displacement field will be utilized to reduce unphysical deformation near the fault surface as described later in this document. For domains with intersecting faults, it is preferred to preprocess an existing seismic interpretation and provide the displacement vector for the intersection points as an input to the method.

The method of FIG. 6 includes two main computer loops, steps 62 and 71, which iterate sequentially over fault surfaces present in the model. Loop 62 is performed in reverse chronological order, and for every fault i, the fault removal optimal control problem is solved (step 63) to numerically remove fault i from the model. After that, the surface meshes and relative displacement vectors are updated in steps 64 and 65 to reflect the change resulting from removing the current fault i from the model. The solution of the optimal control problem, i.e., the optimal rigid body transformations and relative displacement vector fields on the surface of fault i are stored (step 66) for future use in loop 71. When step 67 indicates that loop 62 is finished, i.e. the iterative process has converged to within a predetermined tolerance or other stopping condition is reached, all faults will have been removed from the model and a continuous pseudo pre-faulting state is available to be used. At step 68, the continuous space of the geologic computer model is populated with grids, surfaces, and/or properties of interest to the geologic modeler/stratigrapher. This is the same step that is performed on unfaulted regions of the subsurface, and now can be performed in the vicinity of faults after using a fault removal process such as the present method. Next, the computer algorithm loops (71) over the faults in chronological order. For every fault i, the contents from step 68 (points, grid, surfaces at which values of parameters such as porosity or permeability are specified) are transformed by an inverse transformation in step 72. A suitable inverse transformation is described below. When step 73 indicates that loop 71 is finished, the contents of step 68 have gone through a series of inverse transformations that maps them eventually back to the original faulted domain and the method terminates, and the results may be stored in computer memory at step 74.

Next, step 63 will be discussed in more detail. Seismic interpretation can provide the correlation between horizons and also the relative displacement of correlated horizons intersecting a given fault. As such, the relative displacement field is known only at the intersection of all horizons intersecting a given fault and is unknown anywhere else on the fault surface. U.S. Pat. No. 7,480,205 uses linear interpolation to assign a value to the relative displacement field at locations where its value is not known and solves a mechanical deformation model to accomplish fault removal. Such an arbitrary choice for relative displacement on fault surfaces may lead to severe distortion near the fault and impact the quality of the transformation from continuous space to the original domain greatly. In the present technological advancement, this issue may be addressed through the solution of an optimal control problem that directly aims to minimize distortion and deformation. As mentioned earlier, fault removal needs to be carried out in a geologically acceptable manner. The main question is how to diffuse the available information on fault surfaces into the volume bounded by horizons such that non geological artifacts arising by the fault removal scheme are kept under control. A measure that may be used herein to quantify the term "geologically acceptable" and incorporate it as an objective function in the disclosed iterative fault removal workflow has two main aspects.

First, it is inevitable that horizons intersecting a fault are deformed as an outcome of any fault removal workflow. In this disclosure, the change in the curvature of horizons measured relative to the original faulted case is used as a measure of numerically induced undesirable deformation that needs to be minimized by the workflow. Second, it is also important to make sure that the numerically induced deformation is kept as low as possible between the bounding horizons and along the fault surface. This may be achieved indirectly by augmenting the objective function with a suitable measure of the second derivative of the relative displacement field on the fault surface.

Unlike existing approaches to fault removal, the present technological advancement adopts a purely mathematical approach and uses Laplace's equation as the vehicle for diffusing the imposed displacements on the fault surfaces into the volume. The movement in every Cartesian direction is governed by an associated Laplace equation and a point (x, y, z) in the faulted domain is mapped to (x−φ, y+ψ, z+ζ) in the unfaulted domain. Every fault divides the domain into a left, L, and a right, R, subdomain and each side is free to move according to the solution of the corresponding Laplace equations solved on its side. (In FIG. 1, TL, BL and FL denote, respectively, the top, bottom, and fault surfaces to the left of the fault, and TR, BR and FR denote the same to the right of the fault.)

$$(x_L, y_L, z_L) \rightarrow (x_L + \varphi_L, y_L + \psi_L, z_L + \zeta_L)(x_R, y_R, z_R) \rightarrow (x_R + \varphi_R, y_R + \psi_R, z_R + \zeta_R)$$

As mentioned earlier, rigid body transformations do not cause any distortion or deformation and one important aspect of this work is their optimal use for bringing the correlated horizons as close as possible to one another. As rigid body transformations are linear with respect to the Cartesian coordinates of the point that they act on, they satisfy the Laplace equation identically and can be integrated into the unfaulting process through the boundary conditions.

In the following discussion, $\Omega_L$, $\Omega_R$, $F_L$, $F_R$ respectively denote the volume bounded between two horizons (TL and BL in FIG. 1) to the left of a fault, the correlated volume bounded by two horizons (TR and BR) to the right of the fault, the fault surface for the left hand side volume (shown as FL in FIG. 1), and the fault surface for the right hand side volume (shown as FR in FIG. T). The matrix $\overline{M}$ is the rotation matrix about an axis passing through the point ($c_x$, $c_y$, $c_z$) with unit direction vector ($u_x$, $u_y$, $w_z$) by the angle θ. $T=(t_x, t_y, t_z)$ is a translation vector. Every point in the right volume $\Omega_R$ undergoes a translation by T and a rotation by $\overline{M}$. That may be considered to be the definition of a rigid body transformation. As a result, $\Omega_R$ gets mapped into $\tilde{\Omega}_R$ (the layer between TR1 and BR1 in FIG. 1) where the Laplace's equations are solved for the right hand side of the fault. The introduction of rigid body transformations adds ten extra variables $\chi=(c_x, c_y, c_z, u_x, u_y, w_z, t_x, t_y, t_z, \theta)$ to be optimized in the iterative process.

The deformation and rigid body transformations are governed by the Laplace equations in (1) in the volume and the boundary conditions and by Eqn. 2 on the fault surface.

$$\begin{cases} \nabla^2 \varphi_L = 0 \\ \nabla^2 \psi_L = 0 \quad x \in \Omega_L \\ \nabla^2 \xi_L = 0 \end{cases} \begin{cases} \nabla^2 \varphi_R = 0 \\ \nabla^2 \psi_R = 0 \quad x \in \tilde{\Omega}_R \\ \nabla^2 \xi_R = 0 \end{cases} \quad (1)$$

$$\overline{M}(x_R + T) + \begin{bmatrix} \varphi_R \\ \psi_R \\ \xi_R \end{bmatrix} - \begin{bmatrix} \varphi_L \\ \psi_L \\ \xi_L \end{bmatrix} + x_R - x_L = 0 \quad (2)$$

$$x_R \in FR \text{ and } x_L \in FL$$

The system of Eqs. (1)-(2) has a unique solution for every arbitrary combination of model parameters Π which consists of χ and the relative displacement vector on the boundary.

The significance and innovativeness of Eqn. (2) is twofold:
1) This boundary condition incorporates rigid body transformations directly into the approach for fault removal.
2) The matching does not occur directly on one of the sides with the other side bearing all the required deformation. Both sides are free to move, and this flexibility is essential when the deformation is large. In FIG. 1, points P and Q→Q1 move to meet at F. The matching of the two sides of the fault is done through an auxiliary matching surface (indicated in FIG. 1) that is not known a priori and will be determined by the solution of the optimal control problem as discussed later on.

As mentioned above, there exists a solution of Eqs. (1) and (2) for any arbitrary set of model parameters Π that merges the left and right horizons through an intermediary surface and removes the fault discontinuity. However, the obtained solution may not be "geologically acceptable". This observation sets the stage for formulating the problem as an optimal control problem where out of all feasible parameter sets, one or more optimal sets of Π are sought that minimize the undesirable deformation in the fault vicinity and ensure a "good" transformation from the continuous unfaulted region back into the original faulted domain.

The Laplace equations in (1) may be solved by the classical Boundary Element Method ("BEM"), well known to those skilled in the art of numerical computation, details of which will not be discussed here. In BEM, the solution is found by computing a set of unknowns on the bounding surface of the volume and as such does not require a volumetric grid. For Laplace's equation, the unknowns are the strength of the source and doublet (dipole) panels on the boundary. As the boundary conditions of Eqn. (2) involve only the jump of displacement field across a fault, the BEM formulation used in this disclosure can be written as:

$$\varphi(\xi, \eta) = -\int [\varphi] \frac{\partial G}{\partial n} ds \quad (3)$$

In Eqn. (3), the solution at any point in the domain is found by integrating the influence of double panels over the fault surface. The term $$\frac{\partial G}{\partial n}$$

represents the potential induced at an arbitrary point in the domain due to a doublet (dipole) singularity of unit strength while the unknown strengths [[φ]] are determined by imposing the boundary condition (2). In the present technological advancement, the displacement equations may be solved in the unbounded space with boundary conditions imposed only on the fault surface.

The unknowns of the optimal control problem are χ and dipole strengths on the fault surfaces. The objective function preferably has two parts:
1) A suitable measure of deformation is defined based on the change in the curvature of bounding horizons relative to their faulted configuration. By minimizing this measure, one ensures that among all of the infinite ways of removing the faults, the unfaulting problem chooses one or more ways where the final goal of fault removal is achieved by introducing minimal amount of deformation in the bounding surfaces.
2) This part of the objective function is a suitable measure for controlling undesirable deformations in the bounded volume. This may be imposed implicitly by limiting the spatial variation of doublet strengths on fault surfaces. One way of achieving this goal is by penalizing the second derivatives of dipole strengths along two suitably defined orthogonal directions on the fault surface.

After solving the disclosed optimal control problem with an optimization method such as the steepest descent or nonlinear conjugate gradient algorithms, steps 64 to 66 of the FIG. 6 flow chart are completed, and all the steps 63 to 66 are repeated for the next fault in reverse chronological order.

Upon completion of the fault removal procedure for all faults in the model, the unfaulted domain can be populated with grids, properties and surfaces (step 68). Next, one needs to transform the image of the unfaulted volume back to the faulted volume (step 72). This requires finding the inverse transformation of Eqs. (1) and (2) for the optimal set of unknowns $\chi$ and dipole strengths. In other words, for any given point X in the unfaulted domain, one needs to find a point x in the faulted domain such that x+d=X where d=($\varphi$, $\psi$, $\zeta$) is the displacement vector. The inverse transform may be found by solving iteratively for x using a gradient-based method, where the objective function can be written as $\frac{1}{2}\|(x+d-X)\|^2$. The gradient of the displacement vector d with respect to x is simply the sensitivity of the doublet distribution with respect to the field point coordinates x and can be computed explicitly. Because of the maximum principle property of the Laplace equation, a property well known to persons in the technical field, the iterative method is guaranteed to converge to a unique point x in the unfaulted volume irrespective of the initial guess for x.

Test Results

Figure 2:
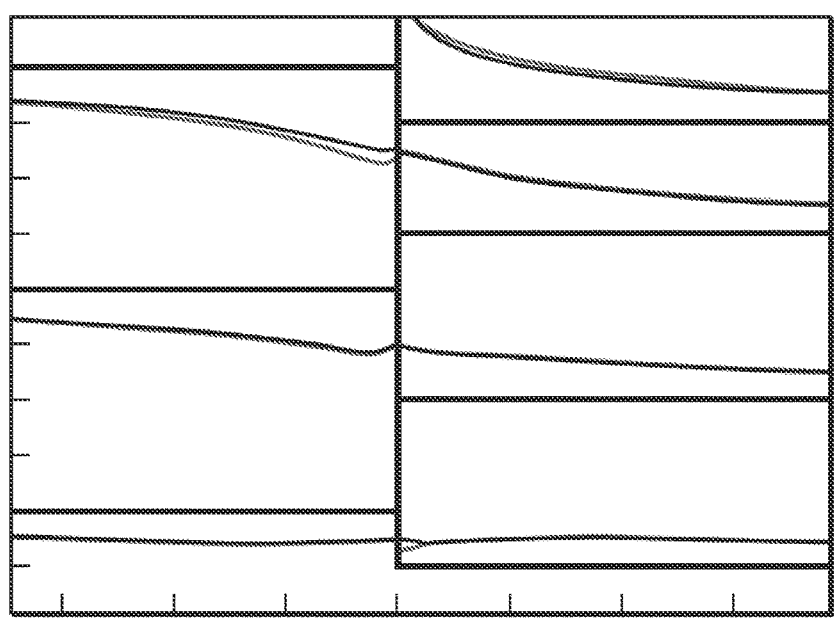
FIG. 2 compares fault removal (steps 62-67 in FIG. 6, going from faulted to continuous space) performed by an example of the present technological advancement (black) (penalizing dipole variation and curvature of horizons) to the result from conventional techniques (gray)

In this section, the present technological advancement is applied to two test cases, using synthetic data: a normal fault with variable throw and a slump fault with large deformation. In FIG. 2, the faulted domain is shown with straight lines representing three horizons on each side of the normal fault. In order to illustrate the effectiveness of posing the unfaulting problem in an optimal control setting, two sets of unfaulting results are presented and discussed. The first unfaulted scenario (gray lines) is computed by linear extrapolation of the throw component of relative displacement in between the horizons. As such, the optimal control problem is avoided and the solution of the equations (1) and (2) can be found in one shot, i.e. a traditional approach. In the second unfaulted scenario (dark curved lines), no assumption about the distribution of fault throw is made in advance but the dipole variation along the fault and the induced curvature on the horizons due to unfaulting are penalized accordingly in the optimal control problem, in which dipole variation and curvature of horizons are penalized. Although both scenarios remove the fault discontinuity and create a continuous space, the second scenario clearly exhibits less unphysical deformation in the bounding horizons. Next, both unfaulted scenarios are populated with parallel lap surfaces, such lap surfaces being among the information that might typically be populated in the continuous space in step 68. (Lap surfaces are created by the lateral movement of a meandering channel well known to persons who work in the technical field of this disclosure.) Then, the unfaulted scenarios are inverse-mapped back to the faulted domain, and we look at what happens to the lap surfaces.

Figure 3:
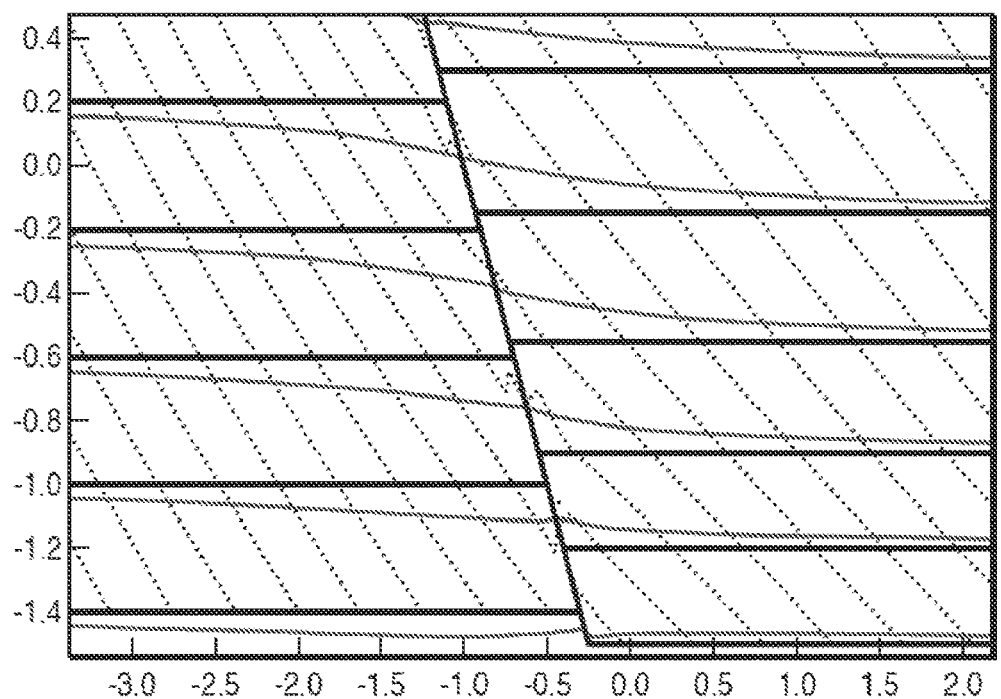
FIG. 3 shows the effect on parallel lap surfaces when the transformation from the continuous domain back to the faulted domain (steps 71-73 in FIG. 6) is performed by traditional methods.
Figure 4:
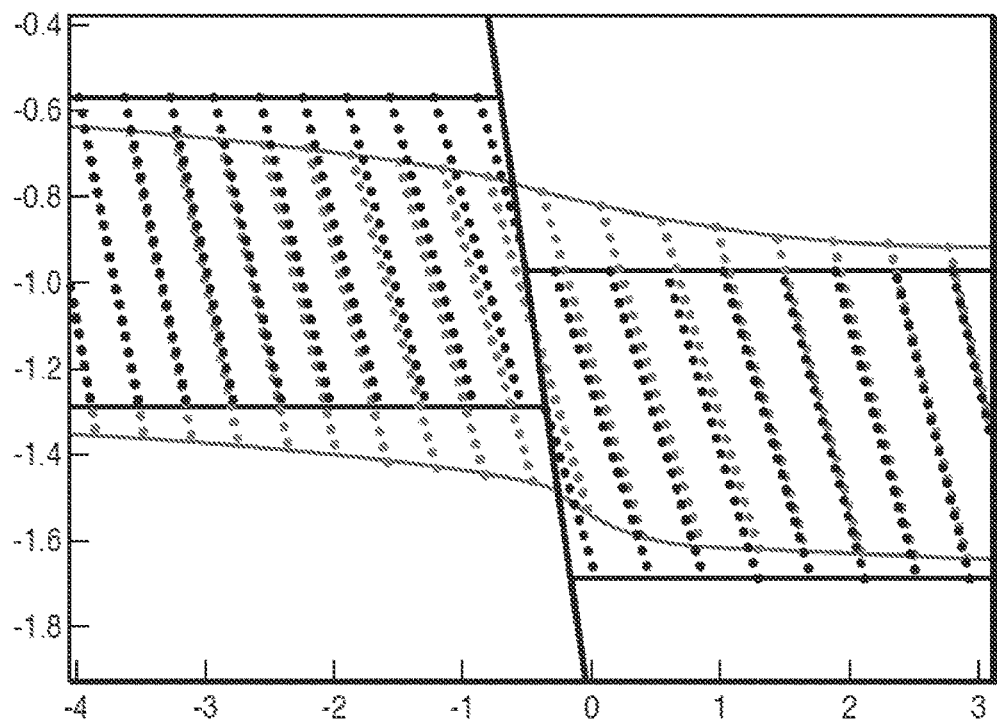
FIG. 4 shows internal layering in the continuous design space compared to the faulted domain.

FIG. 3 shows the lap surfaces as parallel, nearly vertical lines. The horizontal straight black lines are the faulted horizons, and the gray curved lines show the horizons before the fault occurred (as found by a traditional unfaulting technique). FIG. 3 clearly shows that the parallel lap surfaces are entirely distorted near the shock, rendering the unfaulted scenario "geologically unacceptable". However, FIG. 4 shows a close up of the lap surfaces for the second unfaulted scenario where the relative displacement on the fault surface was determined iteratively by the present technological advancement. The lap surfaces in the continuous and faulted domains are depicted as gray and black lines, respectively. Unlike FIG. 3, the transformed surfaces in the original faulted domain do not exhibit much, if any, undesirable numerically induced deformation.

Thus, FIGS. 2-4 show the superiority of the present technological advancement both in the fault removal process (FIG. 2) and in the inverse mapping where the faults are put back in (FIGS. 3-4).

Figure 5:
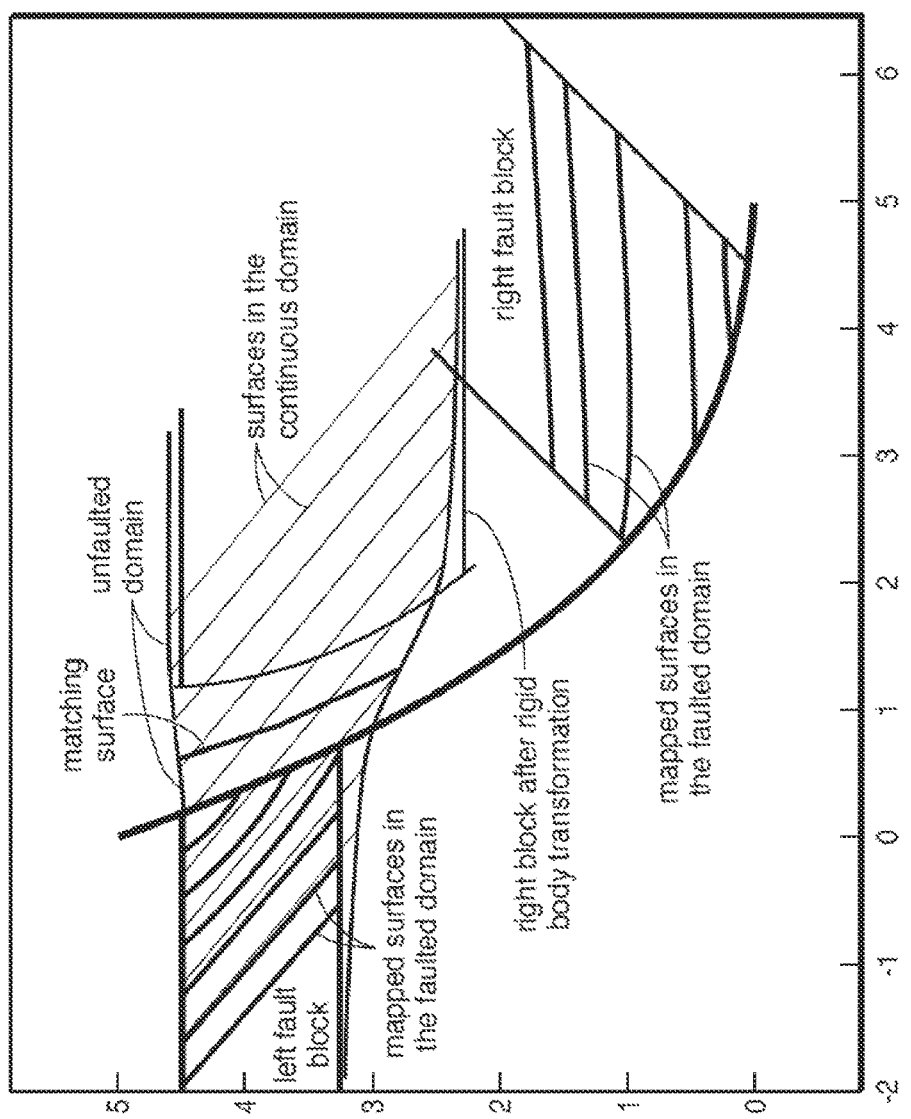
FIG. 5 illustrates the unfaulting of a severe slump growth fault.

Next, results are shown (FIG. 5) for a slump fault with a substantially thicker and rotated downthrown block. In other words, this fault resulted in significant deformation, change in thickness, rotation and translation of the strata. The right hand side block is about twice the thickness of the left block representing a major challenge for finding an unfaulted scenario with a "geologically acceptable" mapping from the unfaulted to the original faulted domain. The optimal control strategy of the present technological advancement finds the optimal rigid body transformation $\chi$ and the Laplace Eqn. dipole strengths to create the unfaulted domain by matching the two sides of the fault through an intermediary surface, shown as the "matching surface" in FIG. 5. It should be noted that the location of the matching surface is not known a priori and is found as a by-product of the solution of the unfaulting problem. As in FIG. 2, the present technological advancement results in very little unphysical deformation in the bounding horizons near the fault. The unfaulted continuous domain is then populated with parallel lap surfaces and the image of those surfaces in the original faulted domain is found by applying the inverse transformation described above. The thick blue lines in FIG. 5 show the mapped lap surfaces in the faulted domain. Despite the extreme deformation and rotation of the right block, the optimal control finds an inverse mapping that deviates only slightly from the desired parallel lap surfaces.

A computer is used to execute the present technological advancement. The computer includes a central processing unit (CPU) is coupled to a system bus and memory devices. The CPU can be any general-purpose CPU that because a specific purpose CPU upon being programmed to implement the present technological advancement. Those of ordinary skill in the art will appreciate that one or multiple CPUs can be utilized. Moreover, the computer can be a system comprising networked, multi-processor computers that can include a hybrid parallel CPU/GPU system. The CPU may execute the various logical Instructions according to the present technological advancement. For example, the CPU may execute machine-level instructions for performing processing according to the operational flow described in FIG. 6.

The computer may also include computer components such as non-transitory, computer-readable media. Examples of computer-readable media include a random access memory (RAM), which can be SRAM, DRAM, SDRAM, or the like. The computer can also include additional non-transitory, computer-readable media such as a read-only memory (ROM), which may be PROM, EPROM, EEPROM, or the like. RAM and ROM hold user and system data and programs, as is known in the art. The computer system may also include an input/output (I/O) adapter, a, communications adapter, a user interface adapter, and a, display adapter.

The architecture of the computer may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" includes a hardware processor (such as those found in the hardware devices noted above), ASICs, and VLSI circuits. Input data to the computer may include various plug-ins and library files. Input data may additionally include configuration information.

The foregoing application is directed to examples of the present technological advancement. It will be apparent, however, to one skilled in the art, that many modifications and variations to the examples described herein are possible. All such modifications and variations are intended to be within the scope of the present invention, as defined in the appended claims.

What is claimed is:

1. A computer-implemented method for fault removal of a plurality faults in a subsurface geological model to populate the model with desired information, comprising:
   (a) ordering the plurality of faults in reverse chronological order, and selecting a fault of the plurality of faults based on the reverse chronological order;
   (b) removing the selected fault by iteratively solving, using a computer, an optimal control problem wherein Laplace's equation is solved for an optimal set of rigid body transformations and boundary displacement vectors on the fault's surface;
   (c) repeating (b) as necessary to remove any remaining faults in the plurality of faults, one at a time, in reverse chronological order, resulting in a transformation of the geological model from faulted space to continuous space;
   (d) populating said geological model with faults removed with selected grids or surfaces or physical property values;
   (e) computing a mapping of the populated geological model back to the faulted space;
   (f) storing the mapping and the populated geological model in the memory of the computer; and
   (g) causing a well to be drilled based on the mapping for the production of hydrocarbons.

2. The method of claim 1, wherein the mapping back to the faulted state is performed in chronological order, one fault at a time.

3. The method of claim 1, wherein Laplace's equation is solved by a boundary element method discretization in an infinite domain, with boundary data imposed on fault surfaces and not on bounding horizons.

4. The method of claim 1, wherein the optimal control problem comprises minimizing an objective function that measures deformation of bounding horizons and internal deformation near a fault surface.

5. The method of claim 1, wherein said optimal set of rigid body transformations and boundary displacement vectors on the fault's surface describe subsurface horizons before the selected fault occurred.

6. The method of claim 1, wherein parameters of the rigid body transformations appear in boundary conditions used in the solving of Laplace's equation.

7. The method of claim 1, wherein the mapping of the populated geological model back to the faulted space comprises determining an inverse of the transformation in (c).

8. The method of claim 7, wherein the inverse transformation is determined by iteratively solving an optimal control problem.

9. The method of claim 1, wherein removing the selected fault comprises matching two sides of the fault through an auxiliary conceptual surface that is determined in the solving of the optimal control problem, wherein both sides of the fault are free to move and meet at the auxiliary conceptual surface.

10. A method for producing hydrocarbons from a subsurface region, comprising:
    obtaining a seismic survey of the subsurface region;
    using processed and interpreted data from the seismic survey to develop a geological model of the subsurface region, said geological model containing one or more faults;
    using a method to populate the model with geophysical information, wherein the method comprises:
      (a) ordering the plurality of faults in reverse chronological order, and selecting a fault of the plurality of faults based on the reverse chronological order;
      (b) removing the selected fault by iteratively solving, using a computer, an optimal control problem wherein Laplace's equation is solved for an optimal set of rigid body transformations and boundary displacement vectors on the fault's surface;
      (c) repeating (b) as necessary to remove any remaining faults in the plurality of faults, one at a time, in reverse chronological order, resulting in a transformation of the geological model from faulted space to continuous space;
      (d) populating said geological model with faults removed with selected grids or surfaces or physical property values;
      (e) computing a mapping of the populated geological model back to the faulted space; and
      (f) storing the mapping and the populated geological model in the memory of the computer;
    using the populated model in planning production of hydrocarbons from the subsurface region; and
    producing hydrocarbons from the subsurface region in accordance with the plan.

11. The method of claim 1, further comprising integrating rigid body transformations to minimize distortion.

12. The method of claim 11, wherein the rigid body transformations comprise one or more linear functions of the Cartesian coordinates.

13. The method of claim 1, further comprising displaying one of the mapping, the populated geological model, and any combination thereof.

* * * * *